US00RE41711E

(19) United States
(12) Reissued Patent
Dumler et al.

(10) Patent Number: US RE41,711 E
(45) Date of Reissued Patent: Sep. 21, 2010

(54) COSMETIC BRUSH

(75) Inventors: Norbert Dumler, Ansbach (DE); Daniela Kulik, Feuchtwangen (DE)

(73) Assignee: Geka Brush GmbH, Bechhofen (DE)

(21) Appl. No.: 29/311,375

(22) Filed: Mar. 3, 2009

Related U.S. Patent Documents

Reissue of:
(64) Patent No.: Des. 574,154
Issued: Aug. 5, 2008
Appl. No.: 29/253,552
Filed: Feb. 9, 2006

(30) Foreign Application Priority Data

Aug. 12, 2005 (EM) ..... 000386388-0002

(51) LOC (9) Cl. ..... 04-02
(52) U.S. Cl. ..... D4/128
(58) Field of Classification Search ..... 15/207.2, 15/206, DIG. 15, 27, 188; 132/218, 317, 132/320; 401/122, 126, 127, 129; D4/128, D4/136
See application file for complete search history.

(56) References Cited

U.S. PATENT DOCUMENTS 4,411,282 A * 10/1983 Wavering ..... 132/218
4,572,224 A * 2/1986 Rosenwinkel et al. ..... 132/218
4,635,659 A * 1/1987 Spatz ..... 132/218
4,802,797 A * 2/1989 Cole ..... 401/122
5,826,600 A * 10/1998 Rowe et al. ..... 132/317
6,616,366 B1 * 9/2003 Weihrauch ..... 132/218
2002/0059942 A1 * 5/2002 Neuner et al. ..... 132/218
2007/0034224 A1 * 2/2007 Dumler ..... 132/218

* cited by examiner

*Primary Examiner*—Jennifer Rivard
(74) *Attorney, Agent, or Firm*—Browdy and Neimark, PLLC

(57) CLAIM

The ornamental design for a cosmetic brush, as shown and described.

DESCRIPTION

FIG. 1 is a top plan view of a cosmetic brush, showing our new design;
FIG. 2 is a side elevational view thereof, the opposite side view being a mirror image; and,
FIG. 3 is a perspective view thereof.

1 Claim, 2 Drawing Sheets

Figure 1:
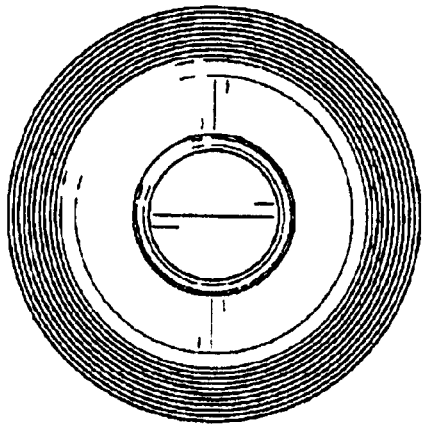
Figure 2:
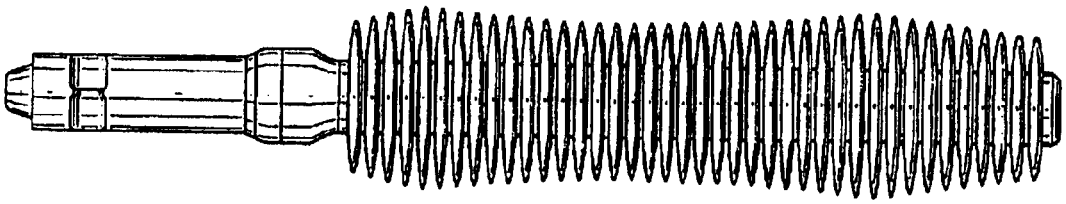
Figure 3:
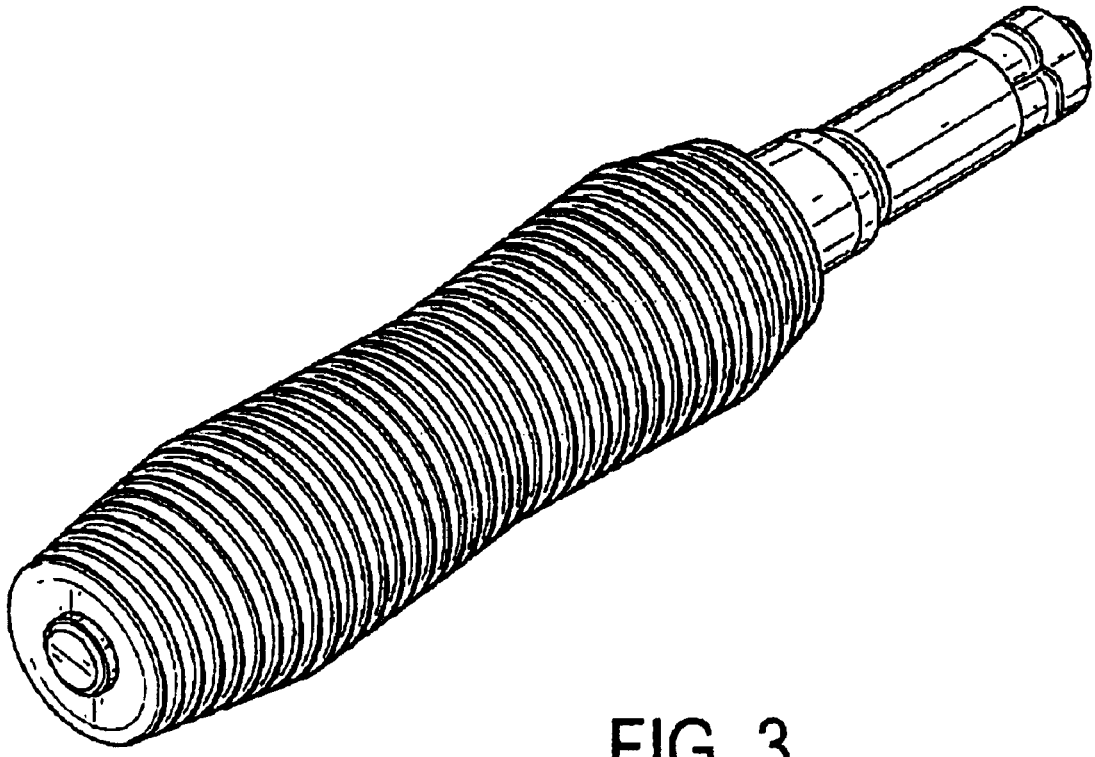

Matter enclosed in heavy brackets [ ] appears in the original patent, but forms no part of this reissue; matter printed in italics indicates the additions made by reissue.

UNITED STATES PATENT AND TRADEMARK OFFICE

CERTIFICATE OF CORRECTION

PATENT NO. : RE 41,711 E
APPLICATION NO. : 29/311375
DATED : September 21, 2010
INVENTOR(S) : Dumler et al.

It is certified that error appears in the above-identified patent and that said Letters Patent is hereby corrected as shown below:

Title page item (30) Foreign Application Priority Data, the number "000386388-0002" should be changed to --000386388-0004--.

Signed and Sealed this

Thirtieth Day of November, 2010

David J. Kappos

David J. Kappos
*Director of the United States Patent and Trademark Office*